United States Patent
Dawson et al.

(10) Patent No.: US 10,990,519 B2
(45) Date of Patent: Apr. 27, 2021

(54) MULTI-TENANT CLOUD ELASTIC GARBAGE COLLECTOR

(71) Applicant: INTERNATIONAL BUSINESS MACHINES CORPORATION, Armonk, NY (US)

(72) Inventors: Michael Dawson, Ottawa (CA); Kenneth B. Kent, New Brunswick (CA); Panagiotis Patros, Fredericton (CA)

(73) Assignee: International Business Machines Corporation, Armonk, NY (US)

(*) Notice: Subject to any disclaimer, the term of this patent is extended or adjusted under 35 U.S.C. 154(b) by 194 days.

(21) Appl. No.: 16/177,583

(22) Filed: Nov. 1, 2018

(65) Prior Publication Data
US 2020/0142822 A1    May 7, 2020

(51) Int. Cl.
*G06F 12/02* (2006.01)
*G06F 11/34* (2006.01)
*G06F 9/50* (2006.01)
*H04L 12/24* (2006.01)

(52) U.S. Cl.
CPC ......... *G06F 12/0253* (2013.01); *G06F 9/505* (2013.01); *G06F 9/5077* (2013.01); *G06F 11/3442* (2013.01); *H04L 41/5019* (2013.01); *G06F 2212/1044* (2013.01)

(58) Field of Classification Search
CPC .... G06F 12/0253; G06F 9/505; G06F 9/5077; G06F 11/3442; G06F 2212/1044; H04L 41/5019

USPC ........................................................ 707/718
See application file for complete search history.

(56) References Cited

U.S. PATENT DOCUMENTS

| | | |
|---|---|---|
| 7,587,492 B2 | 9/2009 | Dyck |
| 7,953,711 B2 | 5/2011 | Soman |
| 8,346,909 B2 | 1/2013 | Dan |
| 9,065,783 B2 | 6/2015 | Ding |
| 9,251,033 B2 | 2/2016 | Kirchhofer |

(Continued)

OTHER PUBLICATIONS

Yingjun Wu et al, Chronostream: Elastic stateful stream computation in the cloud, ICDE Conference, 2015, entire documen.

(Continued)

*Primary Examiner* — Evan Aspinwall
(74) *Attorney, Agent, or Firm* — Patrick J. Daugherty; Daugherty & Del Zoppo Co., LPA

(57) ABSTRACT

Aspects of the present invention provide devices that determine a load for each tenant of a plurality of tenants running applications on a shared computer server for a predetermined interval of time, wherein the computer server includes a plurality of computer processor cores, compute a capacity for each tenant of the plurality of tenants which includes a difference between the load and a service level agreement for each tenant, determine computer processor cores corresponding to the capacity of a largest capacity tenant, wherein the processors cores include a subset of the plurality of computer processor cores for the shared computer server, pin the subset of computer processor cores to perform garbage collection for one or more tenants, and invoke the garbage collection using the pinned subset of computer processor cores which deallocates no longer used memory in a corresponding heap for the one or more tenants.

20 Claims, 5 Drawing Sheets

(56) References Cited

U.S. PATENT DOCUMENTS

| | | | |
|---|---|---|---|
| 9,569,236 B2 | 2/2017 | Birke | |
| 9,584,435 B2 | 2/2017 | Matczynski | |
| 9,697,117 B2 | 7/2017 | Frazier | |
| 10,313,261 B1* | 6/2019 | Walton | H04L 41/145 |
| 2013/0275976 A1* | 10/2013 | Dawson | G06F 9/5061 |
| | | | 718/1 |
| 2014/0359113 A1 | 12/2014 | Krebs | |
| 2016/0014038 A1 | 1/2016 | Thyagarajan | |
| 2016/0171777 A1 | 6/2016 | Todeschini | |
| 2016/0269475 A1 | 9/2016 | Raghu | |

OTHER PUBLICATIONS

Dushmanta Mohapatra, Coordinated memory management in virtualized environments, 2015, entire document.

Ryan Sciampacone et al, Garbage collection in WebSphere Application Server V8, Part 2: Balanced garbage collection as a new option, 2018, entire document.

Panagiotis Patros et al, Investigating Resource Interference and Scaling on Multitenant PaaS Clouds, 2016, entire document.

Anonymous, Minimizing Interference and Improving Locality for Container-Multitenancy through Limiting Resources on Startup, IP.com No. IPCOM000252861D, 2018, entire document.

Lalith Suresh Puthalath, On predictable performance for distributed systems, 2016, entire document.

ip.com, Optimized Tenant Aware Garbage Collection, IPCOM000232459D, 2013, entire document.

Alexandru Iosup et al, On the Performance Variability of Production Cloud Services, 11th IEEE/ACM International Symposium on Cluster, Cloud and Grid Computing, 2011, entire document.

software.ibm.com, Overview of request flow prioritization, 2018, entire document.

Daniel E. Keller, Paradigms and tools for developing dependable realtime software, 2013, entire document.

Patros et al, Mitigating Garbage Collection Interference on Containerized Clouds, 12th IEEE International Conference on Self-Adaptive and Self-Organizing Systems on May 1, 2018, entire document. (Grace Period Disclosure).

Akshay K. Singh, Performance Isolation in Cloud Storage Systems, 2013, entire document.

Peter Mell et al, The NIST Definition of Cloud Computing, National Institute of Standards and Technology, Publication 800-145, 2011, entire document.

Seetharami R. Seelam et al, Polyglot Application Auto Scaling Service for Platform as a Service Cloud, 2015, entire document.

Anonymous, Service-Level-Agreement-Aware Thread-Pool and Request Handling for Application Servers, IPCOM000252550D, 2018, entire document.

Sunil Soman, Task-aware garbage collection in a multi-tasking virtual machine, 2006, entire document.

* cited by examiner

MULTI-TENANT CLOUD ELASTIC GARBAGE COLLECTOR

STATEMENT REGARDING PRIOR DISCLOSURES BY THE INVENTORS

The following disclosure is submitted under 35 U.S.C. 102(b)(1)(A):

DISCLOSURE: Mitigating Garbage Collection Interference on Containerized Clouds, by Panagiotis Patros, Kenneth B. Kent and Michael Dawson; published to the 12th IEEE International Conference on Self-Adaptive and Self-Organizing Systems on May 1, 2018.

BACKGROUND

The field of computing includes memory management of computer servers, particularly garbage collection of electronic memory.

Cloud computing includes computer servers servicing client requests from remote computers running specific applications. The cloud computing can provide application services to clients, such as in an application thread of a virtual machine (VM) running on the server, which executes a specific application. A central processing unit (CPU) or core is a resource that executes program code of the VM on the computer server. An entity or tenant can contract for application services in cloud computing and run independent applications on the server while sharing resources of the computer server, such as CPU, memory, electronic storage, etc.

In cloud computing services, such as Software as a Service (SaaS), multiple tenants can share computing resources, such as processing on a shared computer server. Each tenant runs applications on the computer server, which can include different operating characteristics or a different load placed on the computer server. Resources are pooled for the tenants to provide high utilization of the resources, such as the cores. Each tenant contracts for minimum service level objectives of the operating characteristics through service level agreements (SLAs). For example, an entity can pay more for higher performance characteristics and/or greater resource consumption. Load and service levels are typically measured in CPU/core utilization/allocation, memory utilization/allocation, transaction response time, transaction throughput, and combinations thereof.

Garbage collection (GC) is a process that periodically executes on the computer server, typically independent of the VM, and deallocates computer memory no longer used by application threads. The allocated and unallocated memory for the VM are managed in a heap structure. The deallocated memory in the heap is then available for new memory allocations by the application threads in the VM. As allocated memory in a heap reaches a target maximum or inversely unallocated memory reaches a minimum, GC is performed and pooled cores are assigned to the GC process to deallocate the no longer used computer memory.

GC is related to heap size, which can include an initial allocation of the heap size and a maximum allocation, such as in the "Xms" and "Xmx" parameters of JAVA®. JAVA is a registered trademark of Oracle America, Inc. in the United States or in other countries.

BRIEF SUMMARY

In one aspect of the present invention, a computer-implemented method for garbage collection in a cloud environment includes executing a computer processor determining a load for each tenant of a plurality of tenants running applications on a shared computer server for a predetermined interval of time, wherein the computer server includes a plurality of computer processor cores, computing a capacity for each tenant of the plurality of tenants which includes a difference between the load and a service level agreement for each tenant, determining computer processor cores corresponding to the capacity of a largest capacity tenant, wherein the processor cores include a subset of the plurality of computer processor cores for the shared computer server, pinning the subset of computer processor cores to perform garbage collection for one or more tenants, and performing the garbage collection using the pinned subset of computer processor cores which deallocates no longer used memory in a corresponding heap for the one or more tenants.

In another aspect, a system has a hardware computer processor, computer readable memory in circuit communication with the computer processor, and a computer-readable storage medium in circuit communication with the computer processor and having program instructions stored thereon. The computer processor executes the program instructions stored on the computer-readable storage medium via the computer readable memory and thereby performs garbage collection in a cloud environment, which determines a load for each tenant of a plurality of tenants running applications on a shared computer server for a predetermined interval of time, wherein the computer server includes a plurality of computer processor cores, computes a capacity for each tenant of the plurality of tenants which includes a difference between the load and a service level agreement for each tenant, determines computer processor cores corresponding to the capacity of a largest capacity tenant, wherein the processor cores include a subset of the plurality of computer processor cores for the shared computer server, pins the subset of computer processor cores to perform garbage collection for one or more tenants, and invokes the garbage collection using the pinned subset of computer processor cores which deallocates no longer used memory in a corresponding heap for the one or more tenants.

In another aspect, a computer program product for garbage collection in a cloud environment has a computer-readable storage medium with computer readable program code embodied therewith. The computer readable program code includes instructions for execution by a computer processor that cause the computer processor to determine a load for each tenant of a plurality of tenants running applications on a shared computer server for a predetermined interval of time, wherein the computer server includes a plurality of computer processor cores, compute a capacity for each tenant of the plurality of tenants which includes a difference between the load and a service level agreement for each tenant, determine computer processor cores corresponding to the capacity of a largest capacity tenant, wherein the processor cores include a subset of the plurality of computer processor cores for the shared computer server, pin the subset of computer processor cores to perform garbage collection for one or more tenants, and invoke the garbage collection using the pinned subset of computer processor cores which deallocates no longer used memory in a corresponding heap for the one or more tenants.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
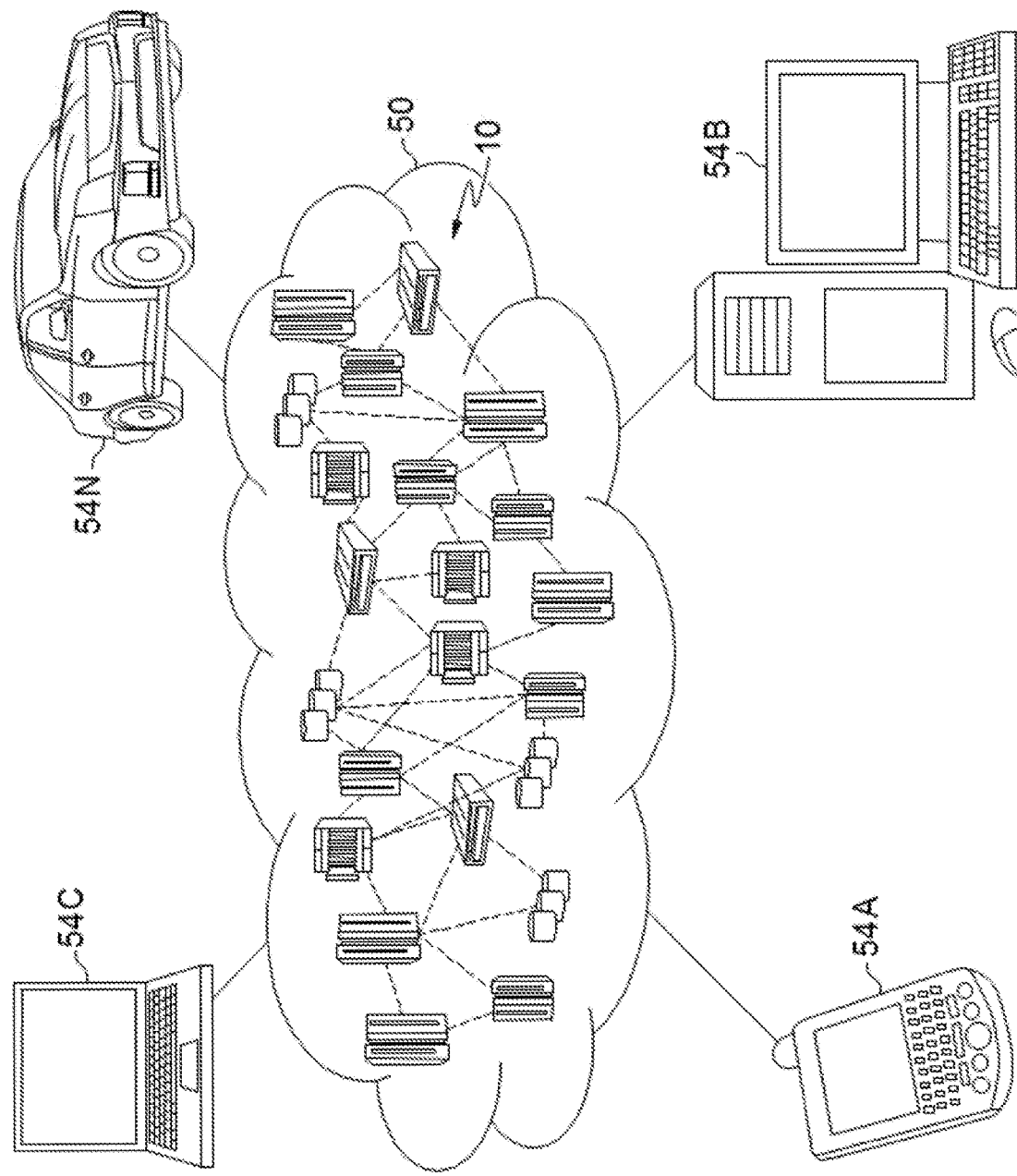
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
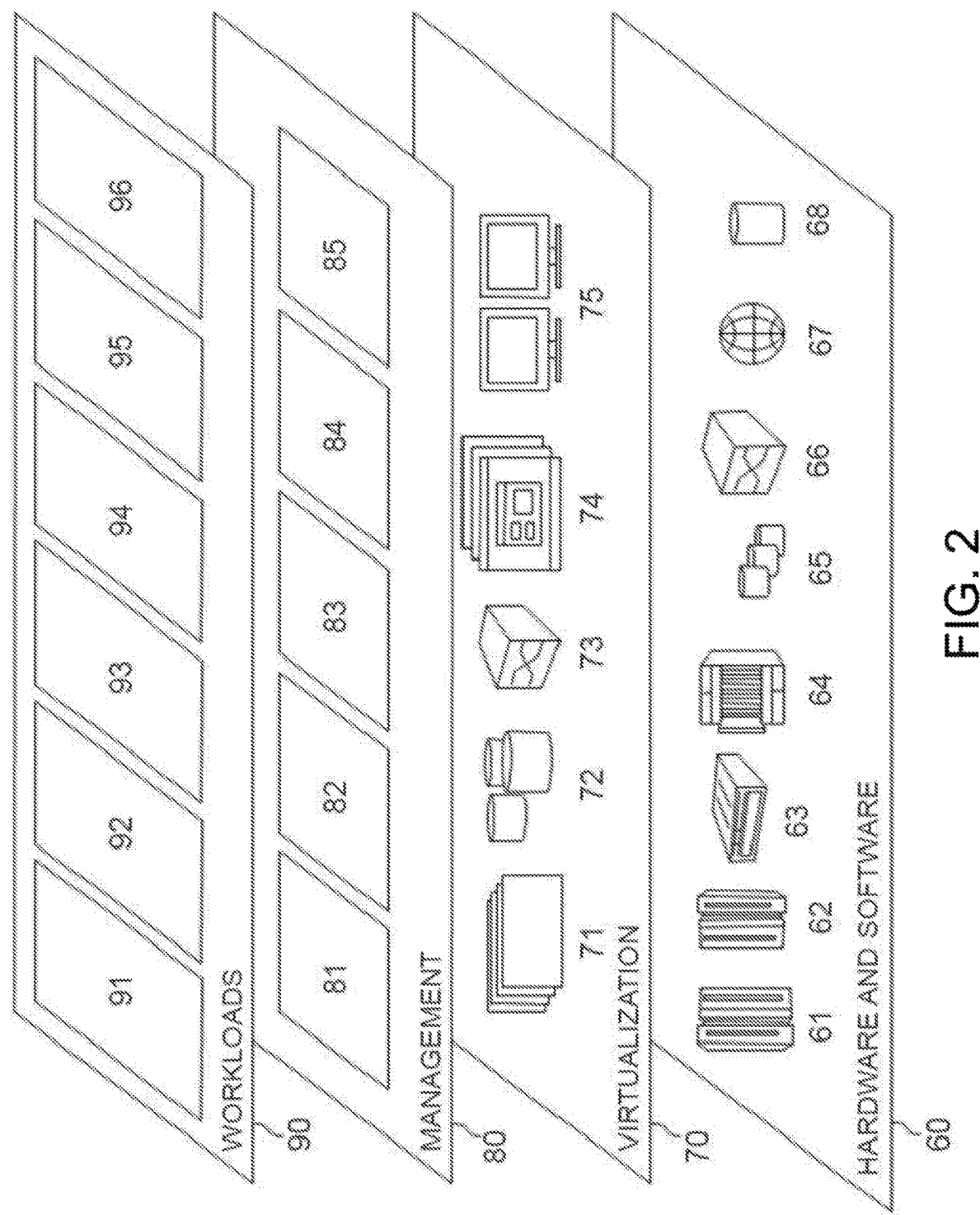
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for garbage collection in a cloud environment 96.

Figure 3:
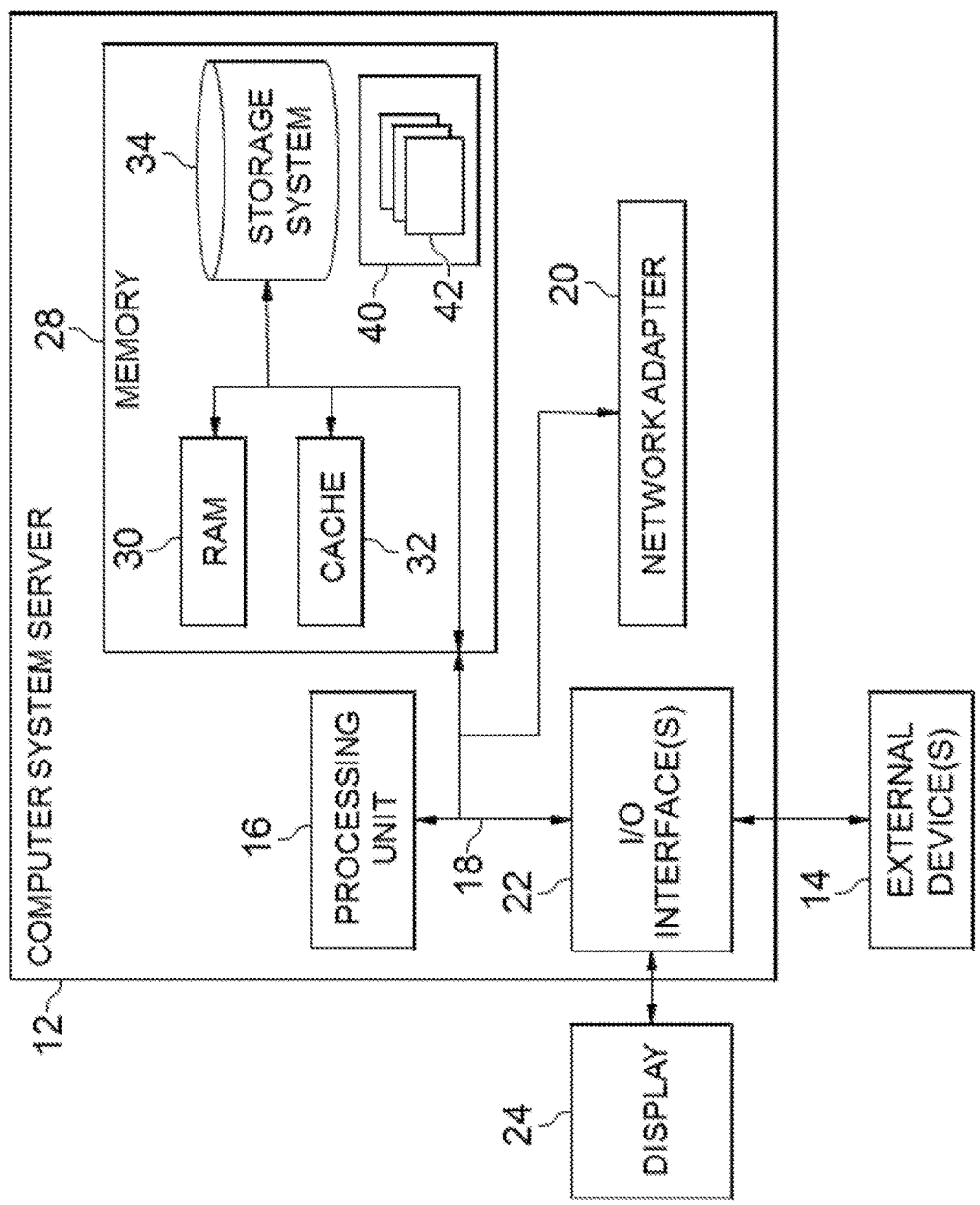
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
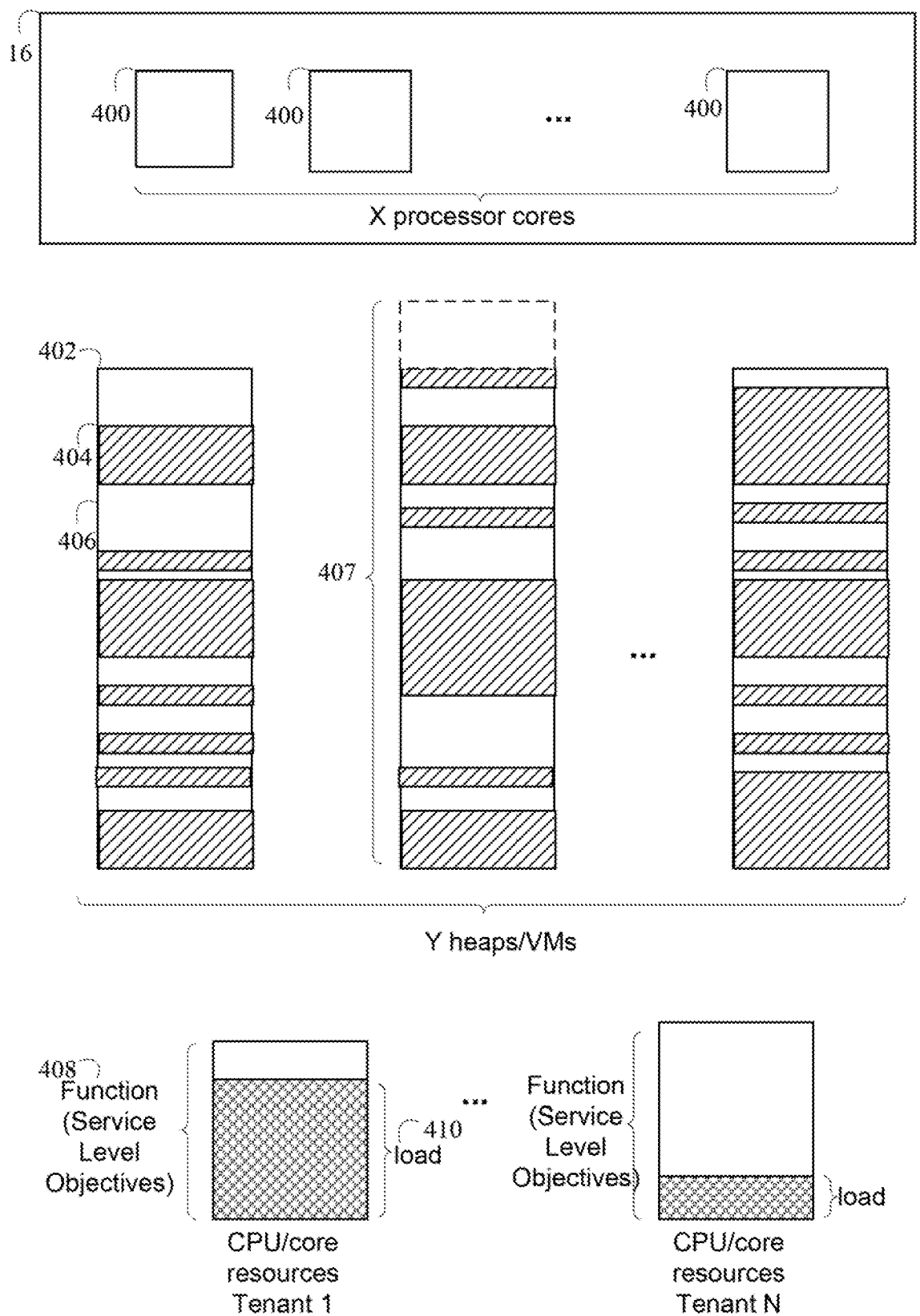
FIG. 4 depicts an example schematic illustration of an embodiment of the present invention.

FIG. 4 schematically illustrates an example according to the present invention for garbage collection in a cloud environment. The processing unit 16 of the computer system/server 12, as described in reference to FIG. 3, includes X processors 400 or processor cores, where X≥2. The processors are assigned to VMs to process application threads and allocate memory from a heap 200 assigned to each VM. A tenant of the system includes one or more VMs. The system includes N tenants, wherein N≥2.

Operating characteristics for each tenant are guided by SLAs, such as described in reference to FIG. 2, which include service level objectives, such as CPU/core utilization, transaction throughput, transaction response time, heap size, allocated heap size, other system parameters, and combinations thereof. The maximum core allocation 408 for each tenant is computed as a function of the operating characteristics of the SLA, which provides a predetermined value for each tenant.

The operating characteristics are collected as statistics for a predetermined interval, such as average, minimum, maximum, standard deviation of core utilization, transaction throughput, transaction response time, allocated memory, and the like. A load 410 is determined, which can include direct measurement of operating characteristics over the predetermined interval or as a function of the operating characteristic statistics, such as with predictive models. For example, input-network traffic of a container can be used as a means to identify the load level of each tenant, which includes core utilization over a predetermined interval. The load 410 is determined for each tenant of the computer system/server 12.

Each heap 402 includes allocated memory 404 and unallocated memory 406. Each heap 402 includes a maximum amount of allocated memory 404 before processing is interrupted for the GC. In some embodiments, each heap 402 includes a minimum amount of allocated memory 404 for which the GC is performed. That is, the GC can be performed when the minimum amount of allocated memory 404 occurs, and the GC is performed when the maximum amount of allocated memory 404 occurs, which, in some instances, can impact performance.

The heap 402 includes a size or total memory allocated to the heap 402, and the size can change. The size can increase up to a maximum size. A computed target heap size 407, which increases/decreases the size of the heap 402 can be based on a ratio of allocated/unallocated memory, rate of memory allocation, size of current heap, and combinations thereof. The computed target heap size 407 can include thresholds, control theory models, maximum likelihood models, and the like.

A subset of the processors 400 is determined to correspond to a capacity of one or more tenants. The capacity of each tenant includes a difference between the maximum core allocation 408 according to the SLA and the determined load 410. The capacity for each tenant can be ranked and cores corresponding to tenants with the largest capacity selected. In some embodiments, the capacity can be determined using control theory, queuing theory, machine learning, a function of the capacity modeled using linear regression, and the like. The selected cores are assigned or pinned to the GC. That is, only the pinned cores are used for the GC, which is less than the available cores for the computer system server 12. In some instances, the SLA for a low load tenant can be satisfied while providing the GC for other tenants in one GC cycle. That is, the core normally used for the low load tenant is pinned for the GC of a higher load tenant and temporarily excludes processing for the low load tenant.

A configured processor can operate as a daemon to perform the assignment or pinning of the CPUs according to the difference between the maximum core allocation 408 according to the SLA and the determined load 410. The daemon is a process that runs in the background and performs the pinning operation at predefined times. The configured processor is suitably embodied by the processing unit 16 or one or more computer processor cores of the processing unit 16 of the computer system server 12 that perform the techniques described here within.

In some embodiments, the configured processor uses an application programming interface (API) to access and change the cores pinned to the GC in a runtime environment, such as JAVA, C++, Python, and the like. In some embodiments, the change in heap size is effective or implemented by performing the GC for the corresponding heap. For example, the GC after marking and sweeping the no longer used memory, add or removes space to the heap. A target size for the heap of a tenant can be computed based on a ratio of allocated/unallocated memory, rate of memory allocation, size of current heap, and combinations thereof. The target size can be limited to system parameters, such as the Xms and Xmx of JAVA. In some embodiments, the configured processor uses an API to access and change the heap size.

The configured processor invokes one or more GC computer processes using the pinned cores and can use the changed heap size. The GC for each corresponding heap, which deallocates no longer used memory in the corresponding heap, can be performed using techniques known in the art. The invocation of the GC can include a call to the GC runtime routine by the daemon. In some embodiments, the configured processor performs the GC.

The number of pinned cores and the target heap size can be changed with each cycle of the daemon. The changing pinned cores provide elasticity in the number of cores performing the GC, which, in some instances, reduce interference between tenants and provide compliance with SLAs.

Embodiments of the present invention provide improvements to the GC in a cloud environment over conventional GC, which freely allocates cores to the GC. In a conventional cloud environment, cores allocated to the GC can affect or interfere with performance of other tenants while the GC runs. That is, spikes in core utilization to process the GC for a tenant can deprive another tenant of operating characteristics per the SLA. Embodiments of the present invention select specific cores to process the GC for a tenant, which are a subset of the cores. In some instances, the use of the subset of cores for the GC smooths the core utilization in the system allocated to the GC.

Figure 5:
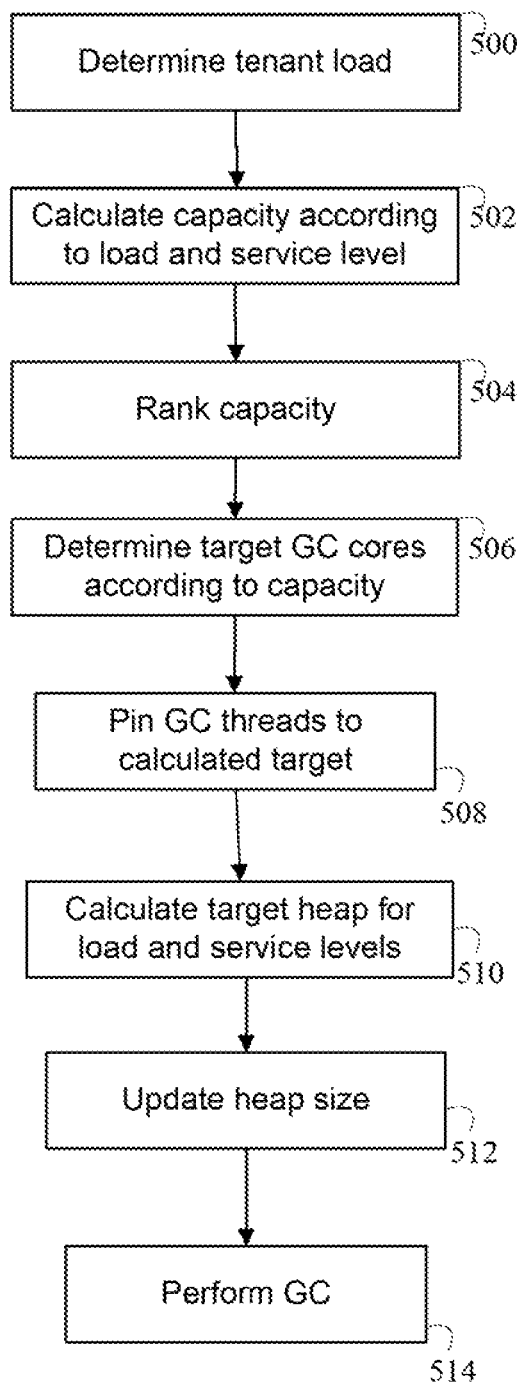
FIG. 5 is a flow chart illustration of an embodiment of the present invention.

FIG. 5 illustrates one embodiment of a method according to the present invention for garbage collection in a cloud environment. At 500, the configured processor determines a load for each tenant running applications on a shared computer server, such as the computer system server 12 described in reference to FIG. 3. The shared computer server includes N tenants, where N≥2. The load is determined for a predetermined interval of time. The load can be determined from statistics or a function of the statistics periodically obtained from the operating characteristics of the computer system server 12.

Each tenant can run one or more VMs on the shared computer server. The VMs are served or processed by the computer processor cores. The load can be aggregated by tenant across VMs for the tenant.

At 502, the configured processor determines a capacity for each tenant. The capacity includes a difference between the load and a service level agreement for each tenant. The configured processor can compute a maximum core utilization according to the service level agreement for each tenant.

At 504, the configured processor can rank the tenants according to the capacity.

At 506, the configured processor determines computer processor cores corresponding to the capacity of one or more largest capacity tenants. The computer processor cores include a subset of the plurality of computer processor cores for the shared computer server. That is, the subset of computer processor cores is defined by S≤X−1, where X is the number of computer processor cores for the shared computer server and S is the number of computer processor cores for the subset.

In some embodiments, the capacity is determined based on a highest ranked capacity tenant. In some embodiments, the subset of computer processor cores correspond to capacities of a largest N capacity tenants, where N is an integer greater than 2.

At 508, the configured processor pins the subset of computer processor cores to perform garbage collection for one or more tenants. The tenants for garbage collection can be selected from the highest load or lowest capacity tenants. In some embodiments, the garbage collection includes all the tenants. The tenants for garbage collection can include heaps of one or more VMs corresponding to the tenant. In some embodiments, the subset of pinned computed processing cores includes specifically identified computer processor cores. For example, the shared computer server includes eight cores: $C_1$, $C_2$, $C_3$, $C_4$, $C_5$, $C_6$, $C_7$, and $C_8$. The load of the highest load tenants indicate that cores $C_1$, $C_2$, $C_3$, $C_4$, and $C_5$ are used for processing the load for the highest tenants. The cores: $C_7$, and $C_8$ are specifically pinned to perform the GC, which leaves $C_6$ to process the loads of the highest capacity tenants. The determination of the subset of cores and the pinning can change with each cycle of the daemon.

At 510, the configured processor can compute a target heap size for at least one tenant. In some embodiments, the computed target heap size is computed for each of the tenants. In some embodiments, the target heap size is computed only for the lowest capacity tenant(s). In some embodiments, the target heap size is computed only for the tenants of cores excluded in the subset of core. For example, tenants A and B are low capacity tenants and tenant C is a high capacity tenant from which the subset of cores has been determined. The target heap size is computed for tenants A and B, and the target heap size is not computed or excluded for tenant C. The change in heap size can include an increase or a decrease. The change in heap size can be different for each VM. The change can be between a minimum and a maximum size parameter obtained from the runtime system, such as the Xms and Xmx parameter of JAVA.

At 512, the configured processor changes a size of the corresponding heap to the target heap size. For example, the configured processor updates a runtime parameter by accessing an API, which allows changing the heap size for one VM. The actual change in heap size becomes effective with the GC.

At 514, the configured processor performs the garbage collection using the pinned subset of computer processor cores, which deallocates no longer used memory in a corresponding heap for the one or more tenants. In the instances of the garbage collection for heaps with changed sizes, the configured processor implements the new size of each corresponding heap. In some instances, the new size decreases the corresponding heap. In some instances, the new size increases the corresponding heap.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   in response to a run-time application programming interface call to a garbage collection routine, determining a load value for each tenant of a plurality of tenants running applications in a distributed cloud computing environment on a shared computer server as a function of measuring input network traffic to each of the tenants for a predetermined interval of time, wherein the shared computer server includes a plurality of computer processor cores;

determining a capacity value for each tenant of the plurality of tenants as a difference between the determined load value and maximum core allocation values for the each tenant;

identifying a first subset of the plurality of computer processor cores that are used to process the load determined for a one of the tenants that has a largest capacity relative to others of the tenants, wherein a total number of the first subset of the plurality of computer processor cores is less than a totality of the plurality of computer processor cores;

assigning a second subset of the plurality of computer processor cores to perform garbage collection for one or more tenants, wherein the second subset processor cores are not within the first subset; and invoking garbage collection using the assigned second subset of computer processor cores which deallocates no longer used memory in a corresponding heap for the one or more tenants.

2. The method of claim 1, further comprising:
computing a target heap size for at least one tenant of the one or more tenants;
changing a size of the corresponding heap to the target heap size; and
wherein invoking the garbage collection includes changing the size of the corresponding heap.

3. The method of claim 1, wherein identifying the first subset of computer processor comprises identifying a subset of computer processor cores which correspond to capacities of a largest N capacity tenants, where N is an integer greater than 2.

4. The method of claim 1, wherein a total number of the second subset of the processor cores is less than a totality of remaining others of the plurality of computer processor cores that are not within the first subset; and
wherein at least one processor core of the remaining others of the processor cores that is not within the first subset or within the second subset is available for processing the load of the one of the tenants that has the largest capacity.

5. The method of claim 1, further comprising:
ranking the tenants according to the capacity; and
identifying a highest ranked tenant as the one of the tenants that has the largest capacity.

6. The method of claim 1, further comprising:
determining the maximum core utilization values for each of the tenants according to a service level agreement for each tenant.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer readable storage medium via the computer readable memory and thereby performs the determining the load value for the each tenant, the determining the capacity value for the each tenant, the identifying the first subset of the plurality of computer processor cores, the assigning the second subset of the plurality of computer processor cores to perform the garbage collection, and the invoking the garbage collection using the assigned second subset of computer processor cores.

8. The method of claim 7, wherein the computer-readable program code is provided as a service in a cloud environment.

9. A system for garbage collection in a cloud environment, comprising:
a computer processor in circuit communication with a shared computer server in a distributed cloud computing environment, wherein the shared computer server includes a plurality of computer processor cores;
a computer readable memory in circuit communication with the computer processor; and
a computer readable storage medium in circuit communication with the computer processor;
wherein the computer processor executes program instructions stored on the computer readable storage medium via the computer readable memory and thereby:
in response to a run-time application programming interface call to a garbage collection routine, determines a load value for each tenant of a plurality of tenants running applications in the distributed cloud computing environment on the shared computer server as a function of measuring input network traffic to each of the tenants for a predetermined interval of time;
determines a capacity value for each tenant of the plurality of tenants as a difference between the determined load value and maximum core allocation values for the each tenant;
identifies a first subset of the plurality of computer processor cores that are used to process the load determined for a one of the tenants that has a largest capacity relative to others of the tenants, wherein a total number of the first subset of the plurality of computer processor cores is less than a totality of the plurality of computer processor cores;
assigns a second subset of the plurality of computer processor cores to perform garbage collection for one or more tenants, wherein the second subset processor cores are not within the first subset; and
invokes garbage collection using the assigned second subset of computer processor cores which deallocates no longer used memory in a corresponding heap for the one or more tenants.

10. The system of claim 9, wherein the processor executes program instructions stored on the computer readable storage medium via the computer readable memory and thereby:
computes a target heap size for at least one tenant of the one or more tenants;
changes a size of the corresponding heap to the target heap size; and
wherein invoking the garbage collection includes changing the size of the corresponding heap.

11. The system of claim 9, wherein the processor executes program instructions stored on the computer readable storage medium via the computer readable memory and thereby identifies the first subset of computer processor cores to includes a subset of computer processor cores which correspond to capacities of a largest N capacity tenants, where N is an integer greater than 2.

12. The system of claim 9, wherein a total number of the second subset of the processor cores is less than a totality of remaining others of the plurality of computer processor cores that are not within the first subset; and
wherein at least one processor core of the remaining others of the processor cores that is not within the first subset or within the second subset is available for processing the load of the one of the tenants that has the largest capacity.

13. The system of claim 9, wherein the processor executes program instructions stored on the computer readable storage medium via the computer readable memory and thereby:
ranks the tenants according to the capacity; and
identifies a highest ranked tenant as the one of the tenants that has the largest capacity.

14. The system of claim 9, wherein the processor executes program instructions stored on the computer readable storage medium via the computer readable memory and thereby:
determines the maximum core utilization values for each of the tenants according to a service level agreement for each tenant.

15. A computer program product for garbage collection in a cloud environment, the computer program product comprising:
a computer readable storage medium having computer readable program code embodied therewith, the computer readable program code comprising instructions for execution by a computer processor in circuit communication with a shared computer server in a distributed cloud computing environment, wherein the shared computer server includes a plurality of computer processor cores, that causes the computer processor to:
in response to a run-time application programming interface call to a garbage collection routine, determine a load value for each tenant of a plurality of tenants running applications in the distributed cloud computing environment on the shared computer server as a function of measuring input network traffic to each of the tenants for a predetermined interval of time;
determine a capacity value for each tenant of the plurality of tenants as a difference between the determined load value and maximum core allocation values for the each tenant;
identify a first subset of the plurality of computer processor cores that are used to process the load determined for a one of the tenants that has a largest capacity relative to others of the tenants, wherein a total number of the first subset of the plurality of computer processor cores is less than a totality of the plurality of computer processor cores;
assign a second subset of the plurality of computer processor cores to perform garbage collection for one or more tenants, wherein the second subset processor cores are not within the first subset; and
invoke garbage collection using the assigned second subset of computer processor cores which deallocates no longer used memory in a corresponding heap for the one or more tenants.

16. The computer program product of claim 15, wherein the instructions for execution cause the computer processor to:
compute a target heap size for at least one tenant of the one or more tenants;
change a size of the corresponding heap to the target heap size; and
wherein invoking the garbage collection includes changing the size of the corresponding heap.

17. The computer program product of claim 16, wherein the instructions for execution cause the computer processor to identify the first subset of computer processor cores to includes a subset of computer processor cores which correspond to capacities of a largest N capacity tenants, where N is an integer greater than 2.

18. The computer program product of claim 15, wherein a total number of the second subset of the processor cores is less than a totality of remaining others of the plurality of computer processor cores that are not within the first subset; and
wherein at least one processor core of the remaining others of the processor cores that is not within the first subset or within the second subset is available for processing the load of the one of the tenants that has the largest capacity.

19. The computer program product of claim 15, wherein the instructions for execution cause the computer processor to:
rank the tenants according to the capacity; and
identify a highest ranked tenant as the one of the tenants that has the largest capacity.

20. The computer program product of claim 15, wherein the instructions for execution cause the computer processor to:
determine the maximum core utilization values for each of the tenants according to a service level agreement for each tenant.

* * * * *